US007016606B2

(12) United States Patent
Cai et al.

(10) Patent No.: US 7,016,606 B2
(45) Date of Patent: Mar. 21, 2006

(54) ERROR MITIGATION SYSTEM USING LINE CODING FOR OPTICAL WDM COMMUNICATIONS

(75) Inventors: Yi Cai, Baltimore, MD (US); Tulay Adali, Baltimore, MD (US); Curtis R. Menyuk, Baltimore, MD (US)

(73) Assignee: University of Maryland Baltimore County, Baltimore, MD (US)

( * ) Notice: Subject to any disclaimer, the term of this patent is extended or adjusted under 35 U.S.C. 154(b) by 728 days.

(21) Appl. No.: 10/204,779

(22) PCT Filed: Feb. 28, 2001

(86) PCT No.: PCT/US01/06218

§ 371 (c)(1),
(2), (4) Date: Aug. 23, 2002

(87) PCT Pub. No.: WO01/65735

PCT Pub. Date: Sep. 7, 2001

(65) Prior Publication Data

US 2003/0020983 A1    Jan. 30, 2003

Related U.S. Application Data

(60) Provisional application No. 60/185,400, filed on Feb. 28, 2000.

(51) Int. Cl.
*H04B 10/08* (2006.01)
*H04K 3/00* (2006.01)
*G06F 12/00* (2006.01)
*G06K 5/04* (2006.01)

(52) U.S. Cl. .............................. 398/27; 398/25; 398/39; 398/159; 711/217; 714/701
(58) Field of Classification Search .................. 398/25, 398/27, 39, 159; 711/217; 714/701
See application file for complete search history.

(56) References Cited

U.S. PATENT DOCUMENTS

| | | | | |
|---|---|---|---|---|
| 5,638,070 A | * | 6/1997 | Kuwaoka | 341/95 |
| 6,079,007 A | * | 6/2000 | Emery et al. | 711/217 |
| 6,308,249 B1 | * | 10/2001 | Okazawa | 711/218 |

* cited by examiner

*Primary Examiner*—M. R. Sedighian
(74) *Attorney, Agent, or Firm*—Nath & Associates PLLC; Gary M. Nath; Marvin C. Berkowitz

(57) ABSTRACT

An apparatus and method of line coding to mitigate collision induced errors in Wavelength Division Multiplexing (WDM) optical communications systems is disclosed. The apparatus and method prevents Soliton-Soliton-Collision induced errors by reducing a variance in a number of possible collisions between solitons in multiple channels in a WDM fiber optic communication system using a sliding window criterion. The sliding window criterion defines a set of parametric values based on physical properties of the transmission network, a transmission frequency and a defined data block size. N-bit codes are iteratively selected and sequentially assigned to segments of a mapping table indexed by all possible unique combinations of "1"s and "0"s in a block of data. Input data blocks are mapped to corresponding code words having a reduced number of transitions for transmission on the fiber optic network. Received code words are converted back to a data stream corresponding to the input data stream.

16 Claims, 13 Drawing Sheets

ERROR MITIGATION SYSTEM USING LINE CODING FOR OPTICAL WDM COMMUNICATIONS

RELATED APPLICATION

This application claims priority to provisional application Ser. No. 06/185,400, filed Feb. 28, 2000, entitled BLOCK SLIDING WINDOW CRITERION CODES, the contents of which are incorporated herein by reference in their entirety.

FIELD OF THE INVENTION

This invention is directed generally to high capacity fiber-optic communications systems and networks, and is particularly directed to mitigating optical pulse collision induced errors in fiber-optic communications systems through use of line coding.

BACKGROUND

The growth in demand for broadband services has led to increased activity in research and development of high capacity optical systems and networks. It has been predicted that quasi-linear optical communication systems such as Chirped Return-to-Zero (CRZ) and Dispersion Managed Soliton (DMS) systems will play an important role in these future networks.

The capacity of existing standard optical fiber currently installed is far greater than the capacity presently utilized. This capacity potential can, for example, be exploited through use of Wavelength-Division Multiplexing (WDM) in quasi-linear optical systems.

In optical communication systems, the main sources of errors include chromatic dispersion, fiber non-linearities, Polarization Mode Dispersion (PMD), and Amplified Spontaneous Emission (ASE) noise from the amplifiers. In WDM optical communication systems nonlinear interactions of optical pulses among different channels can cause severe inter-channel interference which may be converted into Timing Jitter (TJ) thus effectively decreasing the actual capacity.

Several different approaches such as fiber dispersion management, a jitter-tracking demultiplexer, optical equalization, Forward Error Correction (FEC), and line coding in optical systems have been proposed to combat these impairments. It has been especially shown that dramatic improvements can be obtained in repeater-less undersea systems by the use of FEC. These studies, however, are primarily based on standard FEC and line coding schemes and there has been little effort to optimize the choice of codes and to design new codes which take into account the physical mechanisms behind the impairments. Moreover, while the use of standard line codes has been studied, they have yet to be implemented in commercial systems.

DESCRIPTION OF THE PRIOR ART

With reference to FIG. 1, a single channel quasi-linear optical transmission system 100 is diagrammatically shown with a transmitter end 102 and a receiver end 104 with a fiber optic path 106 connecting transmitter end 102 with receiver end 104. A sequential digital data stream 108 is shown in a timed relationship to transmission system 100. Digital data stream 108 comprises a sequence of data bits having values of one "1" such as shown at 110a and 110b and data bits having values of zero "0" such as shown at 112a and 112b.

Digital data stream 108 is physically implemented by a stream of optical pulses such as shown at 114 corresponding to the "1"s in digital stream 108. Each "0" and each "1" bit in digital data stream 108 transmitted from transmitter end 102 to receiver end 104 is assigned to one of a plurality of equal time slots such as shown at 116. Each time slot 116 has a time duration T such as shown by an arrow at 118. Transmission of digital data stream 108 from transmitter end 102 to receiver end 104 is achieved by transmitting optical pulse 114 in each time slot 116 in which data stream 108 has a value of "1." At receiver end 104 of transmission system 100, if a time slot 116 does not have an optical pulse 114, such as in time slot 116n, a "0" bit is deemed received. Conversely, if a time slot 116 has an optical pulse 114, such as in time slot 116i, a "1" bit is deemed received. Hence, quasi-linear optical transmissions deal with binary data sequences.

Timing Jitter (TJ) is a main source of errors and limits both a bit rate and a transmission distance in quasi-linear optical transmissions. In Wavelength-Division Multiplexing (WDM) communications, TJ also limits channel spacing and thus system capacity. As is understood by those skilled in the art, TJ is defined as the standard deviation of the timing shifts, as measured from the center of the respective time slots, of the arrival times of the sequence of optical pulses at the receiver. It is produced by several effects, including the Gordon-Haus (GH) effect, Soliton-Soliton Collisions (SSC), the acoustic effect, and Polarization Mode Dispersion (PMD).

Gordon-Haus Effect

In quasi-linear optical transmissions, periodic amplification is needed to maintain the energy of the optical pulses. Because of high gain, low insertion loss, low noise, and polarization insensitivity, Erbium-Doped Fiber Amplifiers (EDFA) are of great interest in quasi-linear transmission systems. The Amplified Spontaneous Emission (ASE) noise of the EDFA is the dominant noise source and results in not only a change of amplitudes but also carrier frequencies of optical pulses. The former causes fluctuation in the optical pulse intensity and the latter causes a fluctuation of the optical pulse arrival time ($\delta t$), which is known as the Gordon-Haus (GH) jitter. If the amplifier's bandwidth is greater than the spectral width of the optical pulses, its noise contribution can be considered as effectively white noise. Hence, a probability density function $\sigma_t$ of the random time $\delta t$ can be expressed using a Gaussian approximation with a variance term given by:

$$\sigma_t^2 = \langle \delta t^2 \rangle = \frac{4.15 \cdot 10^3 \alpha n_a F(G) z^3 D}{t_{FWHM} A_{Eff}} \quad (2.0)$$

where $\alpha$ is a fiber attenuation coefficient; $n_a$ is an amplifier's excess noise parameter; $F(G)$ is a noise penalty function; $G$ is an amplifier gain; $z$ is a transmission distance; $D$ is a fiber dispersion parameter; $t_{FWHM}$ is a full width at a half magnitude of an initial optical pulse; and $A_{Eff}$ is an effective fiber core area.

Soliton-Soliton Collision

Soliton-Soliton Collision (SSC) is a result of collisions among solitons that belong to different channels because of different group velocities in Wavelength-Division Multiplexing (WDM) systems. To understand the physical mechanism of SSC, consider the Non-Linear Schrödinger wave equation (NLS) for a wave traveling at a velocity u as shown in Eq. (2.1).

$$i\frac{\partial u}{\partial z} + \frac{1}{2}p(z)\frac{\partial^2 u}{\partial t^2} + |u|^2 u = -\frac{i}{2}\Gamma u \qquad (2.1)$$

where i is an imaginary number $i=\sqrt{-1}$, u is the intensity, T is a constant based on physical properties of the fiber, and p(z) is a normalized group velocity dispersion profile. Because of a dependence of the second term on the distance z, Eq. 2.1 is no longer a standard NLS. However, it can be transformed into a perturbed NLS by defining:

$u'=u \exp(-\Gamma z/2)$ and $$z' = \int_0^z p(z)dz$$

In the transformed variables, Eq. 2.1 becomes:

$$i\frac{\partial u'}{\partial z'} + \frac{1}{2}\frac{\partial^2 u'}{\partial t^2} + b(z)|u'|^2 u' = 0 \qquad (2.2)$$

where $b(z)=\exp(-\Gamma z)/p(z)$.

The effect of SSC on the performance of WDM systems can be obtained from the NLS by considering the simplest case of two WDM channels.

Complete SSC

In a fiber with uniform parameters, the two solitons with angular frequencies $\pm\Omega$ undergo a velocity shift $\delta\Omega$ during a time t over a distance z defined by:

$$\delta\Omega = \frac{1}{2\Omega}\int dt\,\text{sech}^2(t-\Omega z)\text{sech}^2(t+\Omega z) \qquad (2.3)$$
$$= \frac{2}{\Omega}\frac{[2\Omega z\cosh(2\Omega z) - \sinh(2\Omega z)]}{(\sinh(2\Omega z))^3}$$

The velocity shift and its derivative (the acceleration) are shown in FIG. 2a for a complete SSC. In FIG. 2a, the horizontal axis is the normalized distance, that is it is a normalized value of the distance Z divided by the collision length $L_{coll}$, or $Z/L_{coll}$. The vertical axis on the left side of the graph is acceleration, and the vertical axis on the right side of the graph is velocity. A graph of the velocity shift is plotted at 210 and of the acceleration is plotted at 220. From Eq. (2.3) it can be seen that $\delta\Omega_{max}=2/(3\,\Omega)$, and that $\delta\Omega$ returns to zero after the collision is over. Thus, the only net result of the collision is a displacement in time δt of each soliton which is obtained by integrating Eq. (2.3). The collision retards the slower of the solitons and advances the faster of the solitons. For two channels with an optical frequency difference Δf, the simplified complete SSC model can be described with the following equations:

1. Timing shift for each collision:

$$\delta t \approx \pm 0.1768\frac{1}{\tau\cdot(\Delta f)^2} \qquad (2.4)$$

where τ is the Full Width at Half Maximum (FWHM) of a soliton pulse.

2. Collision length:

$$L_{coll} = \frac{2\tau}{D\cdot\Delta\lambda} \qquad (2.5)$$

where D is fiber chromatic dispersion and Δλ is a wavelength difference of the two channels.

3. Maximum number of collisions for each soliton during the whole transmission path:

$$N_{ch1ch2} = \frac{Z\cdot D\cdot\Delta\lambda}{T} \qquad (2.6)$$

where Z is the transmission distance and T is the data transmission period.

Partial SSC:

In realistic optical WDM systems, however, the use of lumped amplifiers and fiber dispersion management has the potential to unbalance the SSC and thus cause partial SSC. Consider the situation shown in FIG. 2b. FIG. 2b is a graph of acceleration of solitons during a collision versus the normalized distance in a partial SSC. Thus, in FIG. 2b the horizontal axis is a normalized value of $Z/L_{coll}$. The vertical axis on the left side of the graph is acceleration and the vertical axis on the right side of the graph is dispersion. In FIG. 2b acceleration is plotted at 230 and dispersion is plotted at 240. In FIG. 2b, a collision is centered about a step change of D shown at 250 in a dispersion-managed soliton system. Although the acceleration 230 has the same absolute peak values 260, 262 for each half 270, 280 of the collision, the duration ($L_{coll}$) is different for each half 270, 280, corresponding to different alternating values of D. Thus, the integral of the acceleration 230 over the entire collision is not zero. Hence, the unbalanced acceleration yields a net velocity shift that remains after the collision has been completed. Such velocity shifts, when multiplied by the remaining distances to the end of the system, could easily result in an unacceptably large jitter in pulse arrival times.

SSC induced timing jitter is highly correlated from pulse to pulse. The net time displacement of a given pulse, from collisions with pulses of another channel, is proportional to the number of collisions that the pulse experiences as it traverses the system and that number can change by only ±1 collision from one pulse to the next. Hence, the number of bit errors caused by SSC have bursty characteristics, such as shown in FIG. 3. In FIG. 3 a bit error pattern 300 caused by timing induced timing jitter is plotted for a 14 Gbps inner channel of four channels. In FIG. 3 the horizontal axis is the number of bit errors and the vertical axis is the number of bits.

The Acoustic Effect

The acoustic effect is generated by the intensity gradient of the optical solitons transverse to the propagation direction in the optical fiber. By affecting the fiber refractive index, the acoustic effect can produce changes in central frequencies and temporal locations of the solitons and thus cause Timing Jitter (TJ). As noted previously, TJ is defined as the standard deviation of the timing shift of the arrival times of the solitons. It has been shown that the time shifts caused by the acoustic effect are Gaussian distributed. The standard deviation a of the TJ is given by the equation:

$$\sigma = 4.8 \frac{D^2 F^{\frac{1}{2}}}{\tau} z^2 \qquad (2.7)$$

for an unfiltered soliton system, where D is fiber dispersion in psec/nm-km; z is the propagation distance in Megameters (Mm); τ is the FWHM of a soliton pulse; and F is the bit rate in Gbps. With guiding filters, the TJ is reduced by a factor $2/\beta z$ where β is a frequency-damping coefficient. In typical optical fibers, the acoustic waves can survive for up to approximately 100 ns and hence generate inter-symbol interference (ISI) within this time scale.

A typical normalized differentiation of the acoustic effect response function, i.e., an acoustic wave curve, is plotted in FIG. 4. In FIG. 4 the horizontal axis is time, measured in nano-seconds and the vertical axis is a normalized perturbed refractive index δn'(t). In FIG. 4 the acoustic effect decays with time and the significant values of the normalized perturbed refractive index δn'(t) group into five significant segments: $S_1$ shown at 402, $S_2$ shown at 404, $S_3$ shown at 406, $S_4$ shown at 408, and $S_5$ shown at 410, where segment $S_1$ 402 is the first and the most significant segment. Thus, segment $S_1$ 402 will have a dominant effect in inducing timing jitter. FIG. 4 also contains an enlarged view of segment $S_1$ 402 in a superimposed second graph 412. Graph 412 is an enlarged view of $S_1$ 402. The acoustic effect induced time shift at time instant $t_m$, can be written as a function of δn'(t) and the transmitted binary system x(lT) as:

$$\delta_m = \alpha \sum_{l=1}^{N} [\delta n'(t - lT)|_{t=t_m} x(lT)] \qquad (2.8)$$

where α is a variable incorporating a normalization of the perturbation index; N is the number of bits that fall in the duration of the acoustic wave, and T is the duration of the time slot. For one bit, the value of 1/T equals the frequency. Equation 2.8 shows that the impact of the acoustic effect on any particular bit depends in a completely deterministic way on the preceding N bits. Hence, the time shifts of solitons and the induced bit errors are highly correlated from bit to bit.

Thus, it can be seen that induced jitter in a fiber optic transmission system can have a deleterious effect and the mitigating of the errors caused thereby in a dispersion managed soliton system is highly desirable.

SUMMARY OF THE INVENTION

It is an object of the present invention to solve the above described deficiencies in prior art systems. It is a further object to attend to these deficiencies by developing an effective coding solution for mitigating major impairments in the quasi-linear systems.

Prior research has indicated that highly efficient and effective codes and filtering approaches can be developed when the physical characteristics of the optical fiber transmission line are taken into account. Thus, it is a further object of the invention to develop a coding solution based on a clear understanding of the physical mechanisms that limit the attainable data rates and distances in quasi-linear systems. Studies of the acoustic effect in single channel systems and Soliton-Soliton Collision (SSC) in Wavelength Division Multiplexing (WDM) systems have resulted in simplified models in constant dispersion fibers. Additionally, as data rates and the number of WDM channels have increased, dispersion management has become increasingly common in terrestrial optical communication systems. However, polarization effects, particularly Polarization Mode Dispersion (PMD) in terrestrial systems, and Amplified Spontaneous Emission (ASE) have generally not been considered. Hence, it is a further object of the invention to develop the coding solution in consideration of the effects of dispersion management, particularly the PMD and ASE as they relate to the bit error patterns in quasi-linear systems.

It is a further object of the invention to develop effective coding methods based on the basic concept of a Sliding Window Criterion (SWC) and block SWC codes. Concatenated Sliding Window Criterion/Reed-Solomon code (SWC/RS) is an efficient and effective solution for reducing collision-induced timing jitter in optical soliton systems. Thus, it is a further object of the invention to define the relationship between the parameters of the SWC code and the quasi-linear WDM systems to develop rules underlying design of optimal SWC codes for given WDM system parameters. This includes trellis-based SWC coding schemes because of the natural match between a sliding window nature of the physical effects in optical communications and the operation of trellis-based encoding. It is a further object of the invention to develop an adaptive digital approach to compensate the data pattern dependent and highly correlated bit errors in quasi-linear systems.

Finally, it is a further object of the invention to be able to verify the developed coding methods.

These and other features and advantages of the present invention will be understood by those skilled in the art by reference to the following detailed description and appended drawings wherein like numerals represent like elements through the several views.

DETAILED DESCRIPTION

The present invention utilizes the concept of a Sliding Window Criterion (SWC) to develop a line coding method for a computer memory in an optical Wavelength Division Multiplexed (WDM) communications. SWC is defined as a metric that takes into account physical mechanism of errors in optical communications. In particular the present invention utilizes an SWC-based design approach for mitigating errors in quasi-linear transmission schemes.

The main motivation behind the coding scheme of the present invention can be explained by considering the simplified model of Soliton-Soliton Collisions (SSC) such that all collisions are complete collisions. However, the present invention is not limited to soliton effects and can be used to mitigate other errors in a WDM communications system. If a two channel case with optical frequency difference $\Delta f$ is initially considered, a simplified model of Soliton-Soliton Collisions (SSC) can be described by equations 2.4 to 2.6.

When there are complete collisions, after each collision, the faster of the colliding solitons is advanced and the slower one is delayed by the same absolute value of arrival time shift $\delta t$. Given a plurality of system parameters, including Z (transmission distance), D (fiber chromatic dispersion), $\Delta f$ (change in frequency), T(transmission time slot width), and $\tau$ (Full Width Half Maximum of a soliton pulse), the collision length $L_{coll}$, defined as the length between the beginning and end points where the solitons overlay at their half power points, can be calculated. The number of collisions each soliton experiences, $N_{ch1ch2}$, can also be calculated if data sequences of all marks (i.e. all "1"s) are transmitted in both channels. The total timing shift introduced by SSC of each soliton after traversing the whole transmission path is thus simply the product of the number of collisions N that the soliton experiences and the timing shift $\delta t$ for each collision. Thus, it is straightforward to obtain an equation for the timing shift in a Wavelength Division Multiplexing (WDM) system with more than two channels by using the above equations for each pair of channels and summing the results over all channels.

Since the timing shift $\delta t$ for each collision is constant for a given value of $\tau$ and $\Delta f$, a total timing shift of each soliton only depends on a value of N, the number of collisions, which is determined by a pattern of transmitted data in other channels. Given that Timing Jitter (TJ) is nothing but the deviation of the timing shifts of transmitted solitons, the TJ can be effectively decreased if every soliton experiences almost the same number of collisions throughout the entire transmission path. This can be seen, for example, with reference to FIG. 5.

Figure 1:
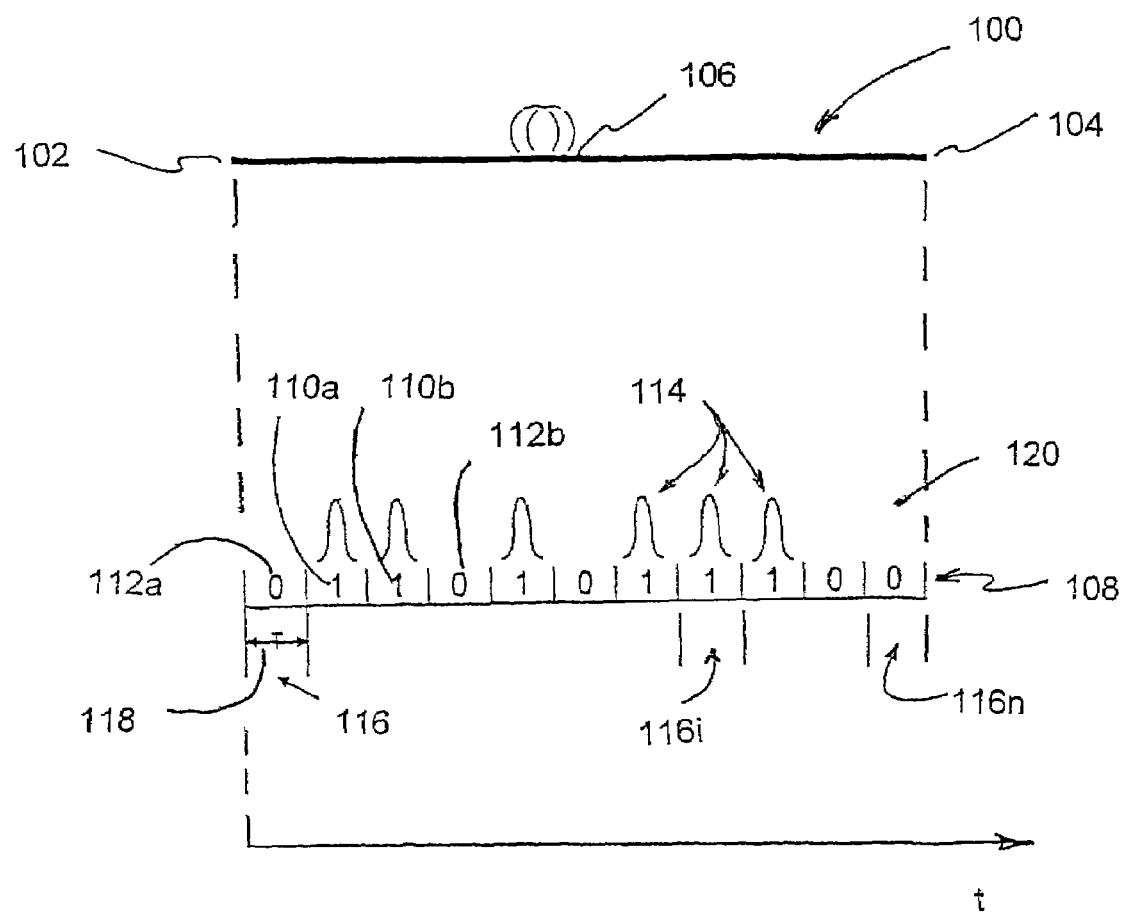
FIG. 1 is a simplified diagrammatic representation of a single channel quasi-linear optical transmission system along a fiber path between a transmitter and a receiver that has been superimposed on a diagrammatic representation of a soliton pulse stream corresponding to a digital data stream transmitted along the fiber path.
Figure 2A:
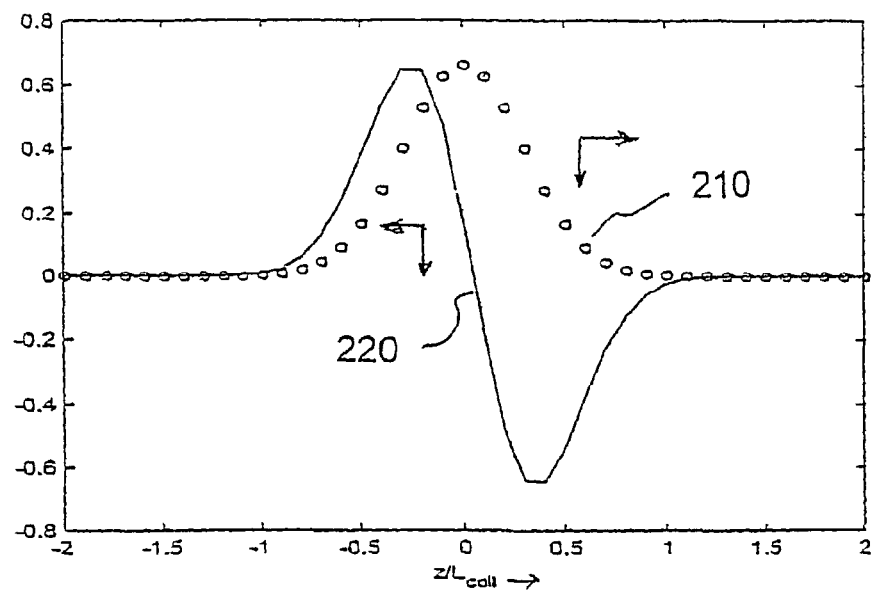
FIG. 2a is a graph of the acceleration and the velocity of solitons during a collision versus a normalized distance for a complete Soliton-Soliton Collision (SSC).
Figure 2B:
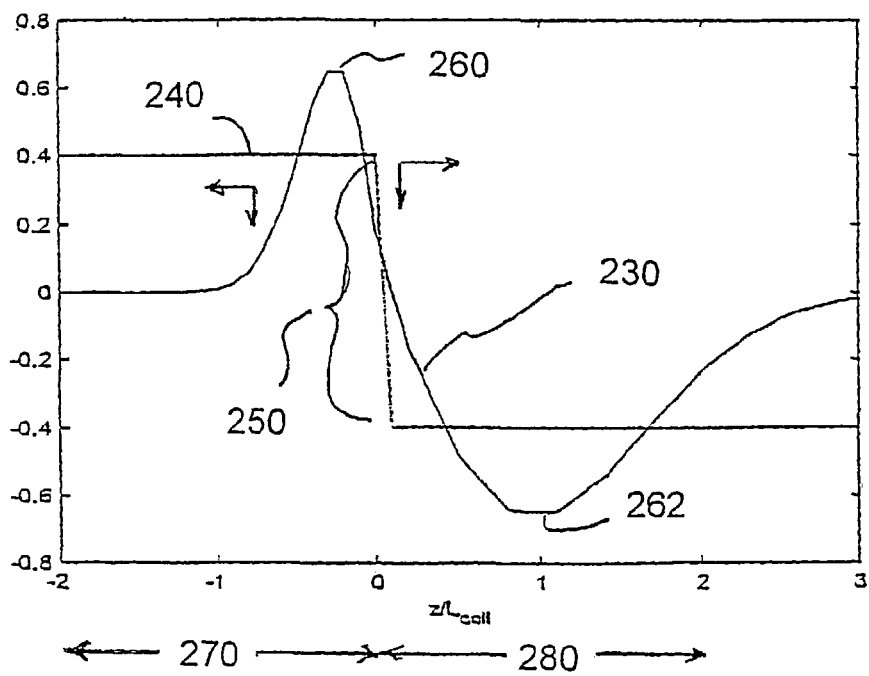
FIG. 2b is a graph of the acceleration and the dispersion of solitons during a collision versus a normalized distance for a partial SSC.
Figure 3:
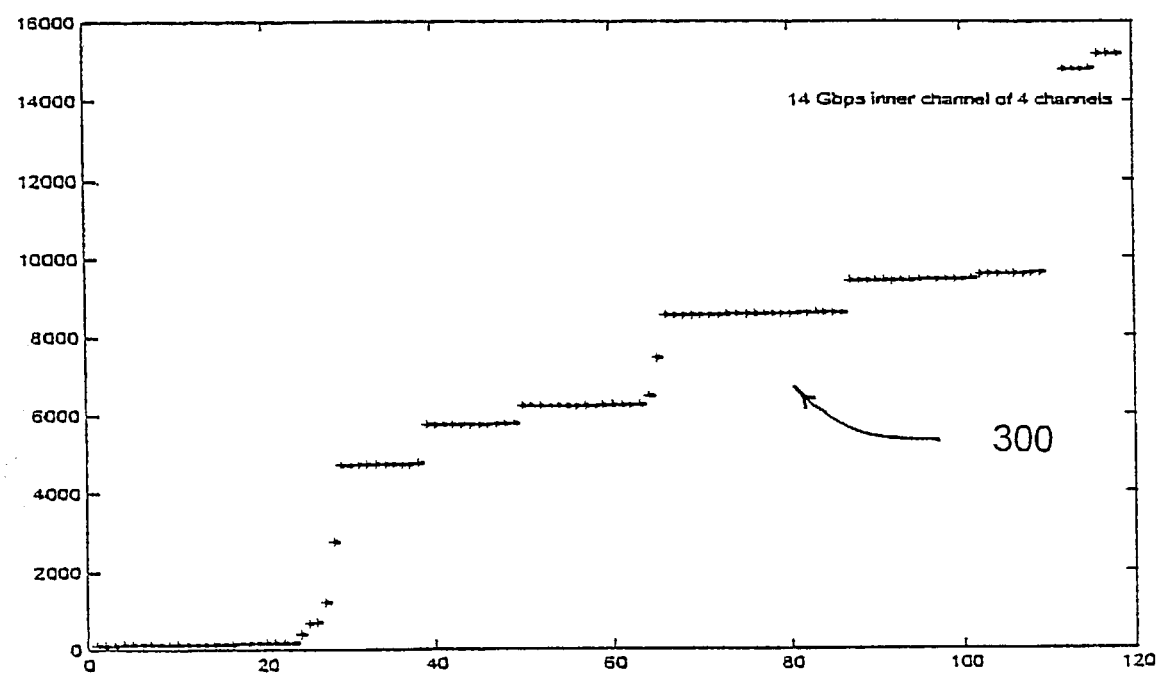
FIG. 3 is a graph of a bit error pattern caused by SSC.
Figure 4:
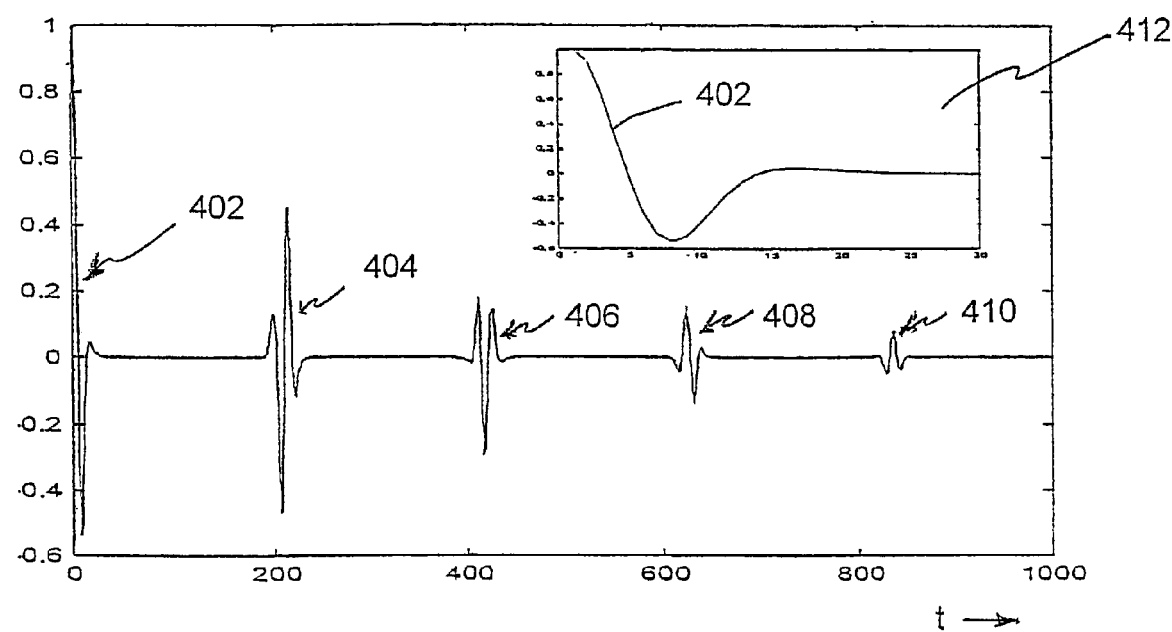
FIG. 4 is a graph of a normalized perturbed refractive index δn'(t) versus time.
Figure 5:
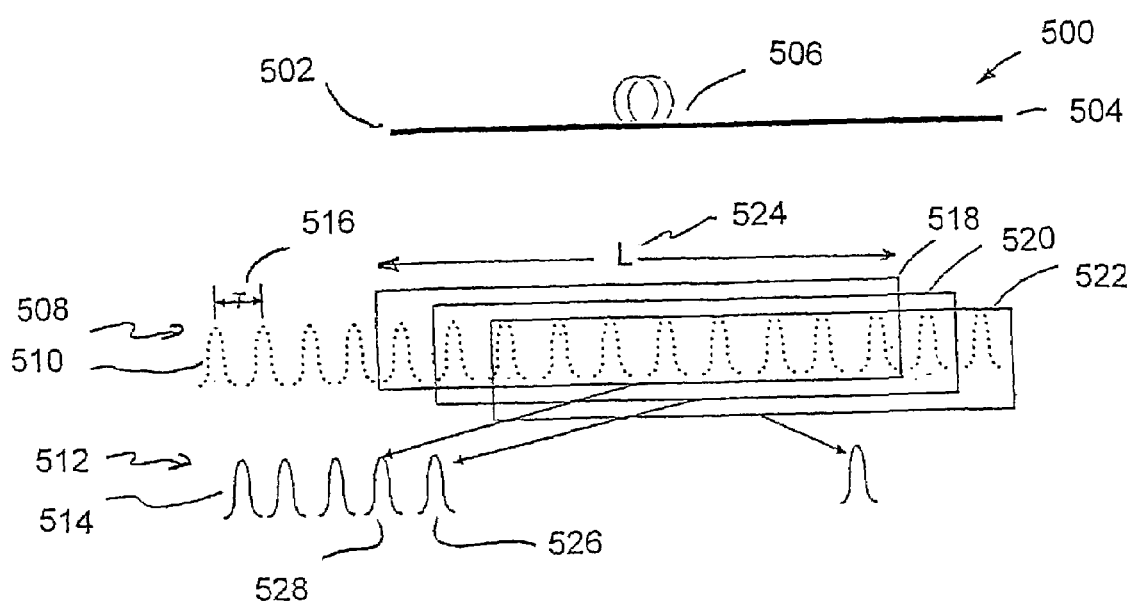
FIG. 5 is a schematic representation of Soliton-Soliton Collisions between two Wavelength Division Multiplexed (WDM) channels in a fiber optic communication system.

In FIG. 5, a two channel quasi-linear optical transmission system 500 is diagrammatically shown having a transmitter end 502 and a receiver end 504 connected by a fiber optic path 506. The double circle logo indicates that only a portion of fiber optic path 506 is shown. Transmission system 500 has a first channel 508 using a frequency $f_1$ shown diagrammatically at 510 and a second channel 512 using a frequency $f_2$ shown diagrammatically at 514 wherein a group velocity in channel 512 is greater than a group velocity in channel 508. A time slot in both channels 510 and 512 has a time duration T, such as is shown at 516. A plurality of rectangular sliding blocks, three of which are shown at 518, 520 and 522, define successive "windows" in which each soliton can experience a collision. Each block or window is defined as being of a length "L", such as shown at 524. In a preferred embodiment of FIG. 5, each sliding block or window has been selected as having a length of L equal to 10. Thus, blocks or windows 518, 520 and 522 are each a 10 bit-block. Other length blocks can also be used, but the length must be greater than the space occupied by the number of bits in a data word. The chosen length depends upon the hardware and the amount of overhead that can be added to the transmission because an input data word will be replaced by a longer code word whose length (i.e. the number of bits) is the length of the block or window.

Since in the example of FIG. 5 the group velocity in channel 512 is greater than the group velocity in channel 508, each soliton transmitted in channel 512 can experience a number of collisions corresponding to the number of solitons in the sliding window in channel 508. For example, since soliton 526 is traveling at a higher velocity than the solitons in window 520, soliton 526 can collide with each soliton in window 520. Similarly, soliton 528 can collide with each soliton in window 518. In the example of FIG. 5, each soliton can have a maximum number of collisions, $N_{ch1ch2}$, equal to ten, thus $N_{ch1ch2}=10$.

Since the overall effect is seen in sliding blocks 518, 520, and 522, a random variable K is defined as a number of marks (e.g. where a mark is a "1" in a data stream) in a sliding window. The criteria of a sliding window includes a performance index. The performance index of a Sliding Window Criteria or SWC over a block of length "L" is defined as: $SWC_L=var(K)$, quantifies the above consideration in that minimization of the variance term will lead to every soliton experiencing a similar number of collisions. The SWC of the present invention is used to construct a mapping code whereby a block of a binary input data sequence is mapped to a corresponding block of encoded data whereby the variance of the number of possible soliton-soliton collisions is reduced in comparison to the original input data.

Figure 6:
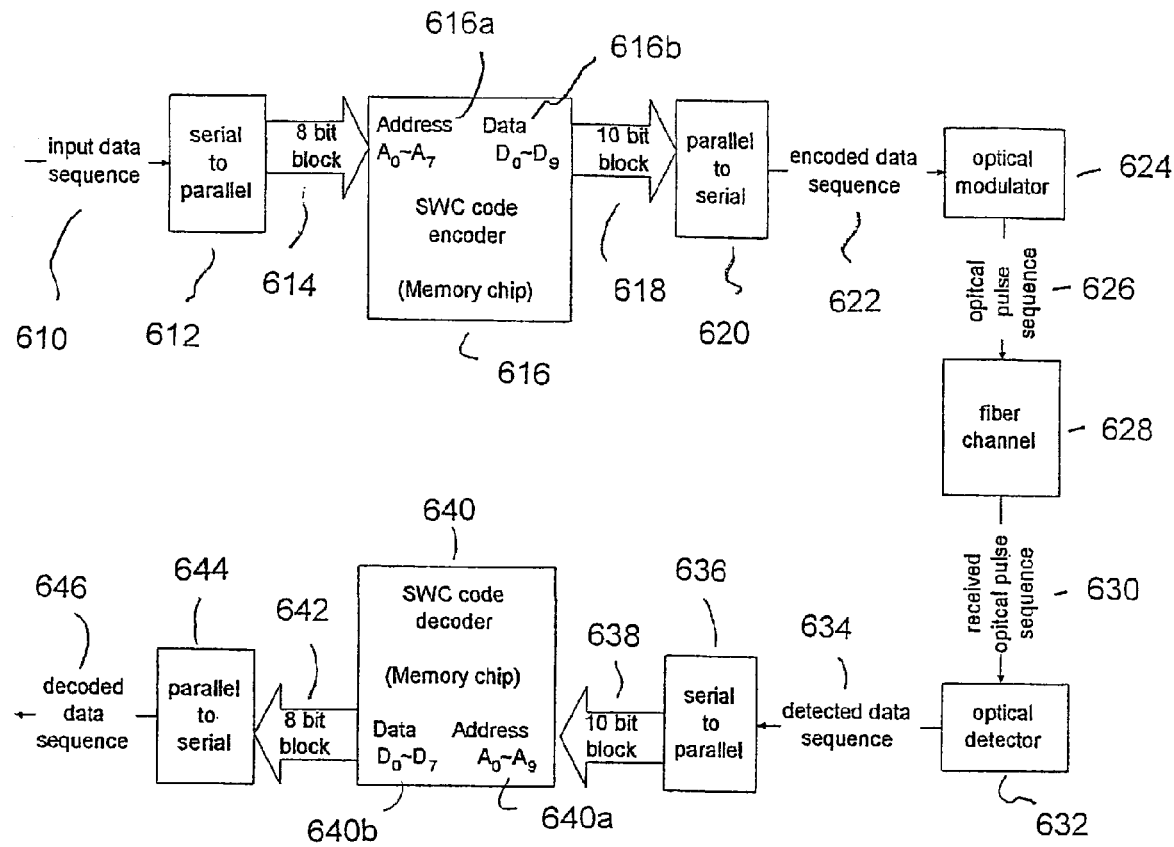
FIG. 6 is a schematic block diagram of a hardware apparatus implementing the block Sliding Window Criterion (SWC) of the present invention.
Figure 7:
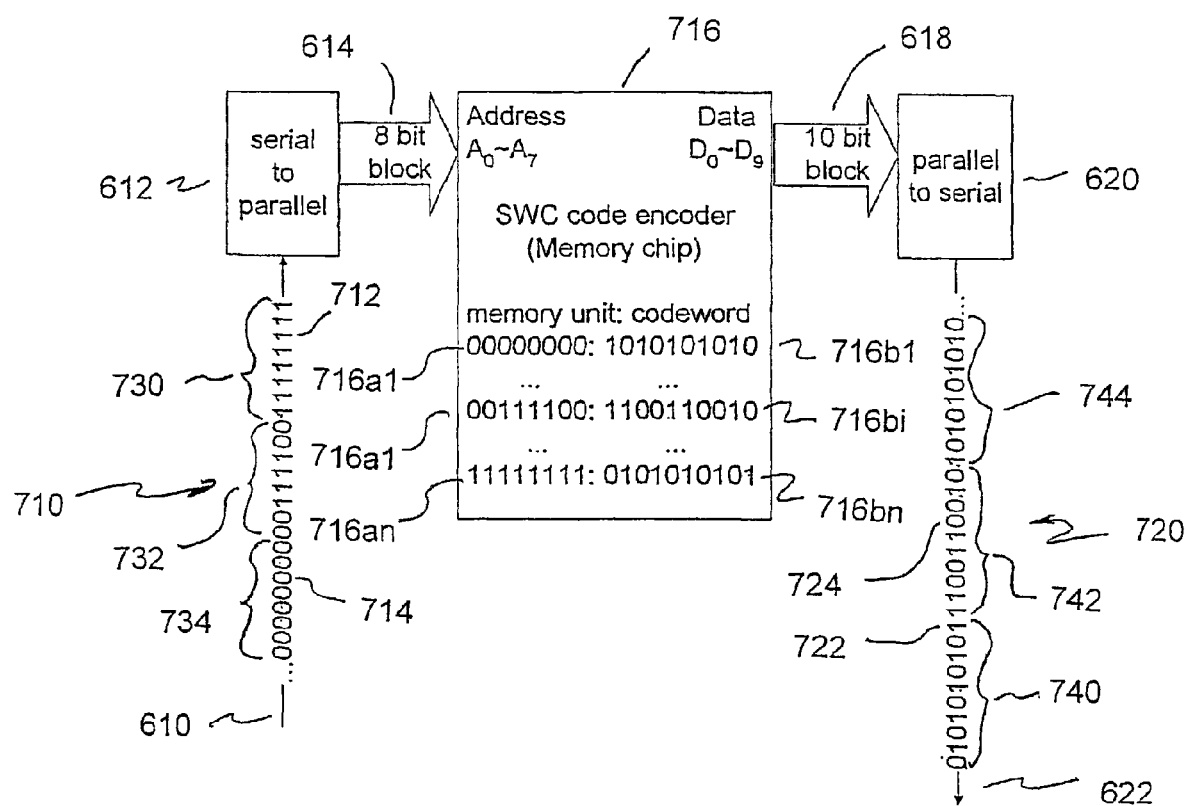
FIG. 7 is an enlarged schematic representation of an encoder of the encoder of FIG. 6.

Referring now to FIGS. 6–7, a schematic block diagram of a hardware apparatus of the SWC method of the present invention is shown. In the preferred embodiment of FIG. 6, a sequence of serial input data 610 that is comprised of a sequence of N-bit blocks 614 is received by a serial-to-parallel converter 612 and converted to a sequence of N plus M bit blocks 614, where M and N are positive integers and N is greater than M. In the example of FIG. 6, N equals 8 and M equals 2. Thus N-bit blocks 614 are 8-bit words and N+M bit blocks 618 are 10-bit words. Other block lengths can also be used. Converter 612 can be a conventional serial-in, parallel-out asynchronous or synchronous shift register. It can also be embodied in software that is used to make a serial-to-parallel conversion.

Converter 616 is connected to an SWC code encoder memory 616 which has $2^N$ memory addresses, such as address 616a. Each of the $2^N$ memory addresses 616a corresponds to a unique combination of N bits in N-bit block 614. For each memory address 616a there is a one-to-one mapping to a corresponding encoded data 616b having N plus M bits. In the example of FIG. 6, encoded data 616b is a 10-bit word. Other block lengths can also be used. An 8-bit block 614 from input data sequence 610 is provided by serial-to-parallel converter 612 to SWC code encoder memory 616 as address signal 616a. The output from SWC code encoder memory 616 is encoded 10-bit data signal 616b that corresponds to address signal 616a. Encoder memory 6161 is depicted as a conventional integrated circuit memory and can be a single conventional fast RAM or ROM memory chip, or it can be a dedicated portion of a main computer memory.

The output of memory 616 is connected to an input address port of a parallel-to-serial converter 620. Converter 620 converts the parallel output of memory 616 to a serial data stream 622. Like converter 612, converter 620 can be either a hardware implementation, such as a conventional parallel-in serial-out asynchronous or synchronous shift register, or a software implementation. Converter 620 is connected to a conventional optical modulator 624 which converts an input electrical pulse sequence to an optical pulse sequence 626.

The output of optical modulator 624 is connected to a transmitter end of a conventional optical fiber channel 628. The receiver end of optical fiber channel 628 is connected to a conventional optical detector that receives a pulse sequence 630 from fiber channel 628. Optical detector 632 converts pulse sequence 630 to serial data sequence 634 of electrical signals. Data sequence 634 is converted by a conventional serial-to-parallel converter 636 to 10-bit blocks 638. Converter 636 can be similar to converter 612, but instead uses a 10-bit serial word.

The output from converter 636 is connected to the address input of an SWC code decoder memory 640. Memory 640 has an inverse mapping of $2^N$ memory addresses, such as address 640a, to data, such as shown at 640b, corresponding to the mapping of encoder 616. Each of the $2^N$ memory addresses 640a corresponds to a unique data 616b of SWC code encoder 616. For each memory address 640a there is a one-to-one mapping to a corresponding decoded data 640b. A 10-bit block from the received data sequence is provided to SWC code decoder memory 640 as an address signal 640a, each 10-bit address pointing to a memory location in which an 8-bit decoded data signal 640b is stored and which replicates an originally provided 8-bit block 614. This data stored in the addressed memory location is provided as a parallel output of 8 bits from SWC code decoder memory 640.

The output of decoder memory 640 is connected to a parallel-to-serial converter 644. Converter 644 converts the parallel output from decoder memory 640 to a serial data stream 646 which is a replicate of input data sequence 610. Converter 644 is similar to, or can be the same as converter 620.

As discussed above, the encoding of an input data word into a block SWC codeword can, by way of example and not by way of limitation, be implemented by writing a mapping table into a memory chip and using an input data block as a memory address. Thus an output of the memory chip is just the encoded data mapped to a corresponding memory address location. An encoding speed is determined by a read cycle time of the memory chip. Similarly, encoded data can be received as the memory address to implement decoding. Currently, a number of high-speed memory chips are commercially available. For example, the Motorola MCM64E918 RAM chip with 19-bit address and 18-bit output to implement a 16B18B SWC code. A minimum read cycle time that can be achieved with this chip is 3 ns, hence an 18 bit/3 ns can be achieved, i.e., 6 Gbps encoding and decoding speeds are achieved. By using k of these chips in parallel, as high as 6 k Gigabits per second (Gbps) encoding and decoding speeds can be achieved.

In FIG. 7, an enlarged, diagrammatic view of an encoder portion of encoder 616 of FIG. 6, is shown. Input data sequence 610 is seen to comprise a sequence of binary bits 710 comprising ones "1"s, such as shown at 712, and zeros "0"s, such as shown at 714. Similarly, encoded data sequence 622 is likewise seen to comprise a sequence of binary bits 720 comprising ones "1"s, such as shown at 722, and zeros "0"s, such as shown at 724.

A first block 730 of 8-bits (thus N=8) of input stream 710 is seen to have all "1"s. Block 730 corresponds to memory address 716$a_n$ in SWC code encoder 616. Mapped to address 716$a_n$ is data codeword 716$_n$. Data codeword 716$b_n$ corresponds to a first encoded 10-bit block 740. A second block 732 of 8-bits of input stream 710 is seen to have two "0"s, four "1"s and two "0"s. Block 732 corresponds to memory address 716$a_i$ in SWC code encoder 616. Corresponding to address 716$a_i$ is data codeword 716$b_i$. Data codeword 716$b_i$ corresponds to a second encoded 10-bit block 742. A third block 734 of 8-bits of input stream 710 is seen to have all "0"s. Block 734 corresponds to memory address 716$a_1$ in SWC code encoder 616. Corresponding to address 716$a_1$ is data codeword 716$b_1$. Data codeword 716$b_1$ corresponds to a third encoded block 744.

The development of the code words stored in memories 616 and 640 will now be discussed. Based on the SWC, a block coding or line code approach which when concatenated with a Reed-Solomon (RS) code provides very effective mitigation of errors. However, when using block codes the ends of the code words need to be considered as well. Thus, to help in the development of code word selection, consider the following definitions:

Fragmental: An n-bit binary block is defined as fragmental if it has at least one transition, i.e., there is at least one occurrence of either a "1" bit followed by a "0" bit or a "0" bit followed by a "1" bit in the n-bit block. A binary signal sequence is defined as n-bit fragmental if any n-bit block in the sequence is fragmental.

Fragmentation degree (FD): An n-bit fragmentation degree of a binary code word is defined as: $FD_n=ml(l-n+1)$ where $FD_n \in [0,1]$, l is a length of a code word, and m is a number of n-bit fragmental blocks in the code word.

Fragmental end (FE): A binary code word is defined as having n-bit fragmental ends (logical TRUE) if its first n bits and last n bits are n-bit fragmental.

The construction of a SWC data-code word mapping table of the present invention determines the ultimate performance of the code. In a preferred mapping table, in the SWC sense, i.e., a mapping table that minimizes an SWC, both a length of a code word and a length of a sliding window are taken into consideration. Hence, code words are selected with: (1) a same number of marks; (2) high fragmentation degrees; and (3) fragmental ends. If the SWC code word is much shorter than the sliding window, there can be several code words within the sliding window implying heavier dependency on the number of marks in the code words than on their FDs. Hence, in a first preferred embodiment of the present invention, rule (1) of code word selection is more heavily weighted as compared to rule (2). Conversely, if the SWC code word is longer than the sliding window, there is less than one code word within the sliding window. Hence SWC will depend more on the FDs of the code words than the numbers of marks in the code words. In this case, in a second preferred embodiment of the present invention, rule (2) is more heavily emphasized than rule (1).

Based on these observations, two alternative mapping table generation algorithms have been developed depending on the emphasis, the Fragmentation-First (FF) algorithm, and the Equal-1-First (E1F) algorithm.

Figure 8A:
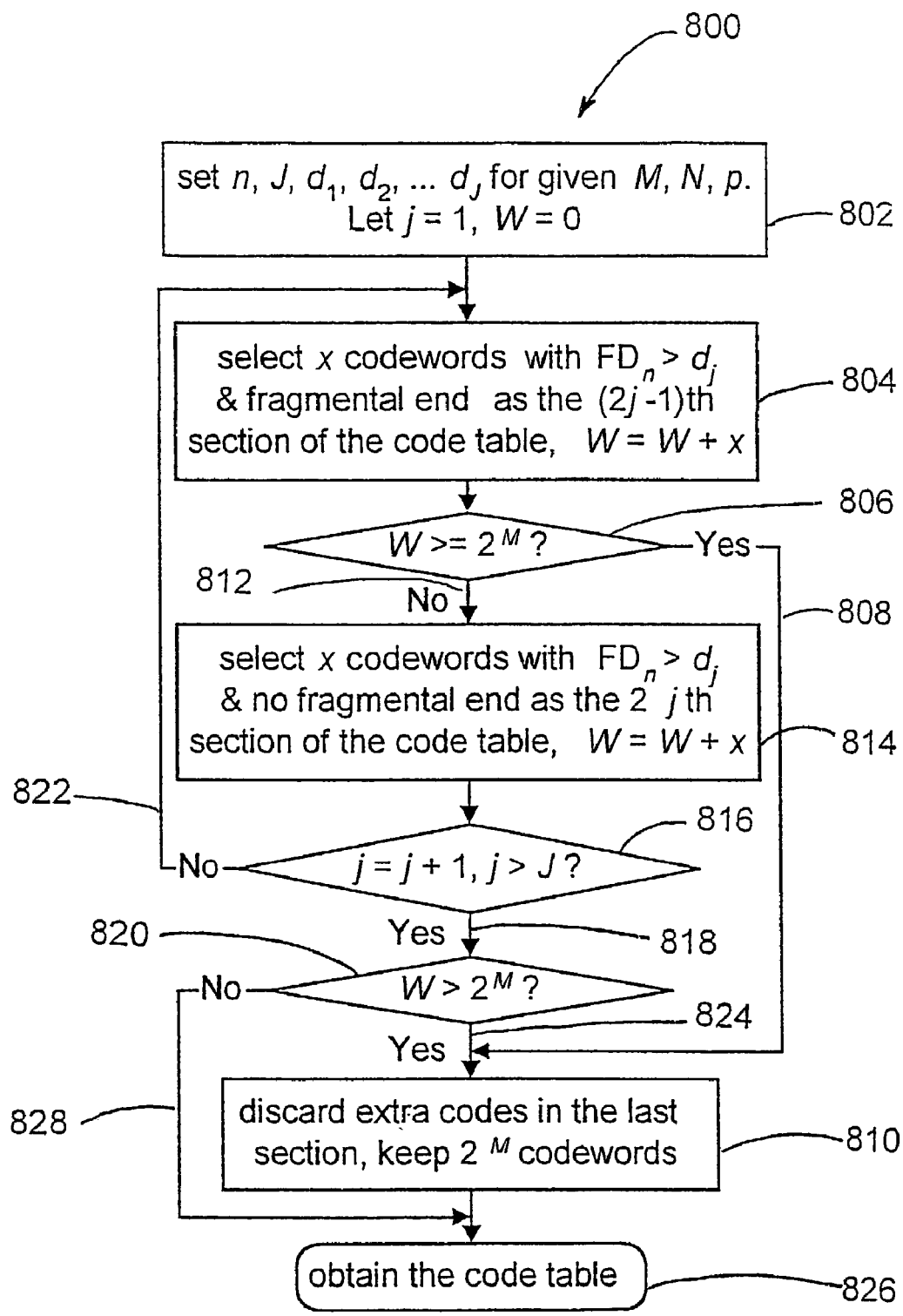
FIG. 8a is a flow diagram of a Fragmentation-First (FF) mapping table algorithm of the present invention.
Figure 8B:
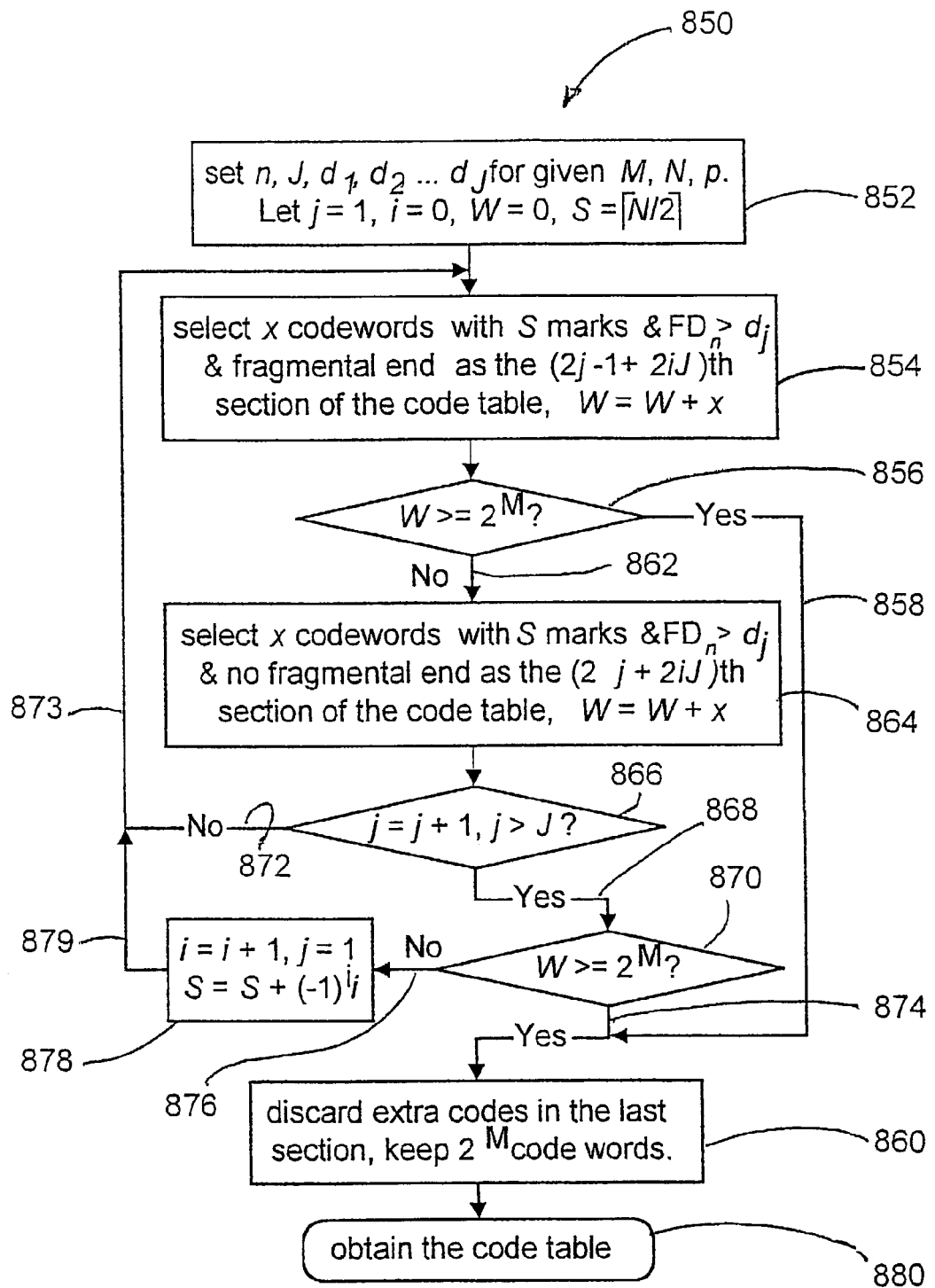
FIG. 8b is a flow diagram of a Equal-1-First (E1F) mapping table algorithm of the present invention.

Flow diagrams of the FF and E1F algorithms are shown in FIGS. 8a and 8b, respectively.

With reference to FIG. 8a, Fragmentation-First (FF) algorithm 800 is diagrammatically shown as a schematic flow diagram. FF algorithm 800 starts at a block 802 by setting values for parameters n, J, $d_1$, $d_2$, ... $d_j$, j, and W based on given values of M, N and p where parameter M is the data-word length; N is the codeword length; p: is the mark probability of the original information data sequence; i and j are counters introduced for the calculation of the index of the sections in the code table; W: is a counter of the number of currently selected codewords in the code table; n is the fragmentation order; J: is the total number of sections in the code table in the fragmentation-first algorithm, and the number of sections for each i in the equal-1-first algorithm; $d_j$: is the minimum fragmentation degree of codewords in the j-th section and $FD_n$: is the n-bit fragmentation degree of codewords. FF algorithm 800 recursively selects code words to construct the mapping table, as described with reference to FIGS. 6–7, as follows: First let j=1 and W=0. FF algorithm 800 then advances to a process block 804. In block 804 a first group of x possible N-bit code words satisfying $FD_n > d_j$ and where Fragmental End (FE) value is TRUE are selected as the ($2_j$–1)th section of the mapping table. Counter W is then incremented by x. FF algorithm 800 then advances to decision block 806 where the number of selected code words W is compared with a value of $2^M$. If the value of the number of selected code words W is equal to or greater than $2^M$, FF algorithm 800 branches by link 808 to process block 810. If, on the other hand, the number of selected code words is less than $2^M$, FF algorithm 800 branches by link 812 to process block 814. In process block 814 x available N-bit codes with $FD_n > d_j$ and a logical Fragmental End (FE) value FALSE are selected as the ($2_j$)th section of the mapping table. Counter W is then incremented by x. From process block 814, FF algorithm 800 advances to decision block 816 where the value of j is incremented by 1 and is then compared to its maximum value J. If the value of j is greater than J, FF algorithm 800 advances by link 818 to decision block 820. If the value of j is not greater than J, FF algorithm 800 returns by link 822 to process block 804. In decision block 820 the number of selected code words W is again compared with the value of $2^M$. If the number of selected code words W is greater than the value of $2^M$, FF algorithm 800 advances by link 824 to process block 810. In process block 810 the extra codes in the last section, in excess of the required $2^M$ code words, are discarded, keeping $2^M$ code words. Then FF algorithm 800 advances to final block 826 where the selected code words are individually assigned to respective addresses in the SWC encoder mapping table of FIGS. 6–7. If, on the other hand, in decision block 820 the number of selected code words is not greater than the value of $2^M$ FF algorithm 800 advances by link 828 directly to final block 826 where the selected code words are individually assigned to respective addresses in the SWC encoder mapping table.

With reference to FIG. 8b, Equal-1-First (E1F) algorithm 850 is similarly diagrammatically shown as a schematic flow diagram. E1F algorithm 850 starts at a block 852 by setting values for parameters n, J, d, 0.2, ... $d_j$ based on given values of M, N (assumed even) and p, as defined with respect to FF algorithm 800 in FIG. 8a.

In the example of FIG. 8b, initial values of j=1, i=0, and S=N/2 are set. E1F algorithm 850 then advances to process block 854 where a first group of x possible N-bit codes with S having values of "1"s, $FD_n > d_j$, and a logical Fragmental End (FE) value is TRUE are selected as the ($2_j$–1+2iJ)th section of the mapping table. Counter W is then incremented by x. E1F algorithm 850 then advances to decision block 856 where the number of selected code words W is compared with a value of $2^M$. If the value of the number of selected code words W is equal to or greater than $2^M$, E1F algorithm 850 branches by link 858 to process block 860. If, on the other hand, the value of the number of selected code words W is less than $2^M$, FF algorithm 850 branches by link 862 to process block 864. In process block 864 x available N-bit codes with S having values of "1"s, $FD_n > d_j$ and a logical Fragmental End (FE) value is false are selected as the ($2_j$+2iJ)th section of the mapping table. Counter W is then incremented by x. From process block 864, E1F algorithm 850 advances to decision block 866 where the value of j is incremented by 1 and then compared to a maximum value J. If the value of j is greater than J, E1F algorithm 850 advances by link 868 to decision block 870. If the value of j is not greater than J, E1F algorithm 850 returns by links 872 and 873 to process block 854. In decision block 870 the number of selected code words W is again compared with the value of $2^M$. If the number of selected code words W is greater than or equal to the value of $2^M$, E1F algorithm 850 advances by link 874 to process block 860. In process block 860 the extra codes in the last section, in excess of the required $2^M$ code words, are discarded, keeping $2^M$ code words. E1F algorithm 850 then advances to final block 880 where the selected code words are individually assigned to respective addresses in the SWC encoder mapping table of FIGS. 6–7. If, on the other hand, in decision block 870 the number of selected code words is less than the value of $2^M$, E1F algorithm 850 advances by link 876 to process block 878 where the value of i is incremented by 1, j is reset to 1, and the value of S is incremented by $(-1)^i j$. From process block 878 E1F algorithm 850 returns via links 879 and 873 to process block 854.

For a random binary input sequence with equal probability of "1"s and "0"s in the sequence (p=0.5), all code words have the same mapping probability and hence it doesn't matter how the code words are arranged in the mapping table. However, if the probability of "1"s and "0"s in the input sequence are unequal, better performance of SWC can be achieved by assigning code words with better SWC features (i.e., lower variance) to input codes with high probabilities. Thus, the mapping tables are divided into several parts according to the pattern of the selected code words.

Figure 9:
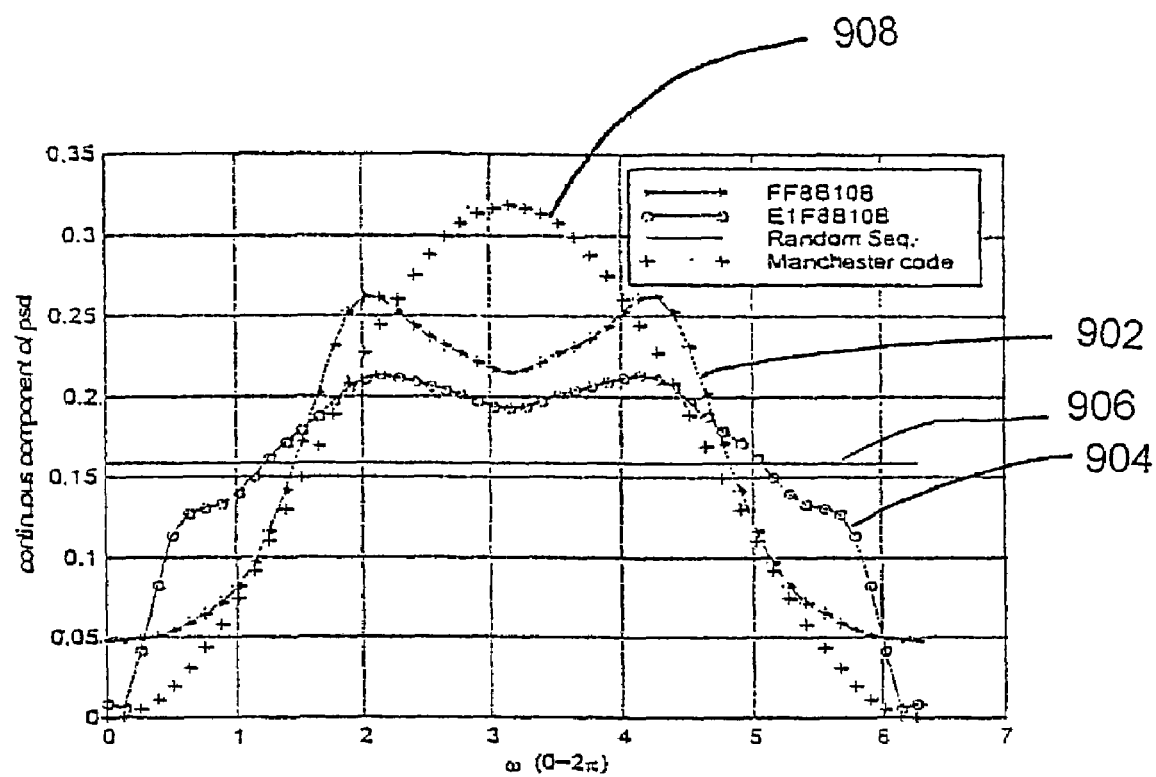
FIG. 9 is a graphical plot of a Power Spectral Density (PSD) of signals encoded by coding algorithms of the present invention compared with signals randomly encoded and encoded by a conventional Manchester code.

The influences of the two algorithms of the present invention on the Power Spectral Density (PSD) of a transmitted signal evaluated using a spectral analysis approach in comparison with two conventional encoding schemes is shown in FIG. 9. In FIG. 9 the horizontal axis is radians where $\omega = 2\pi f$ and the vertical axis is the continuous component of the Power Spectral density PSD.

In FIG. 9, plot 902 represents the PSD of an encoded signal using Fragmentation-First algorithm 800 of the present invention with a 8-bit input block and a 10-bit encoded block. Plot 904 represents the PSD of an encoded signal using the Equal-1-First algorithm 850 of the present invention with an 8-bit input block and a 10-bit encoded block. Plot 906 represents the PSD of an encoded signal using a random sequence; and Plot 908 represents the PSD of an encoded signal using a conventional Manchester code.

As expected, PSD plot 902 of Fragmentation-First algorithm 800 exhibits larger components at high frequencies and hence implies higher transition density than PSD plot 904 of Equal-1-First algorithm 850. However, PSD plot 904 of Equal-1-First algorithm 850, shown by its smaller components at low frequencies, is more balanced than PSD plot 902 of Fragmentation-First algorithm 850.

In an ideal system, i.e., one with no soliton-soliton-collisions and hence no SSC induced timing shifts, each soliton pulse is centered in its respective time slot. However, where soliton-soliton collisions occur, the timing shift caused by the SSC displaces the various soliton pulses from the centers of the time slots. If, for example, a pulse is displaced by ±0.5T, the displaced pulse is then centered at a boundary between successive time slots $T_i$ and $T_{i+1}$. Similarly, if a pulse is displaced by greater than +0.5T, the displaced pulse is then centered in the next successive time slot; and if the pulse is displaced by greater than −0.5T, the displaced pulse is centered in the preceding time slot. Thus, it is possible to misconstrue a pulse which is centered in a time slot as belonging to that time slot when, in fact, the pulse could belong to another time slot. To reduce the likelihood of associating a soliton pulse with an incorrect time slot, an "acceptance window" having a width less than the width of the time slot, but centered in the time slot, is defined. A pulse is construed as being associated with a particular time slot if the pulse is centered in the acceptance window. Thus, an acceptance window in which the ratio of the width of the acceptance window to the width of the time slot approaches "1" in value is less discriminating whereas an acceptance window in which the ratio of the width of the acceptance window to the width of the time slot is smaller is more discriminating.

Figure 10:
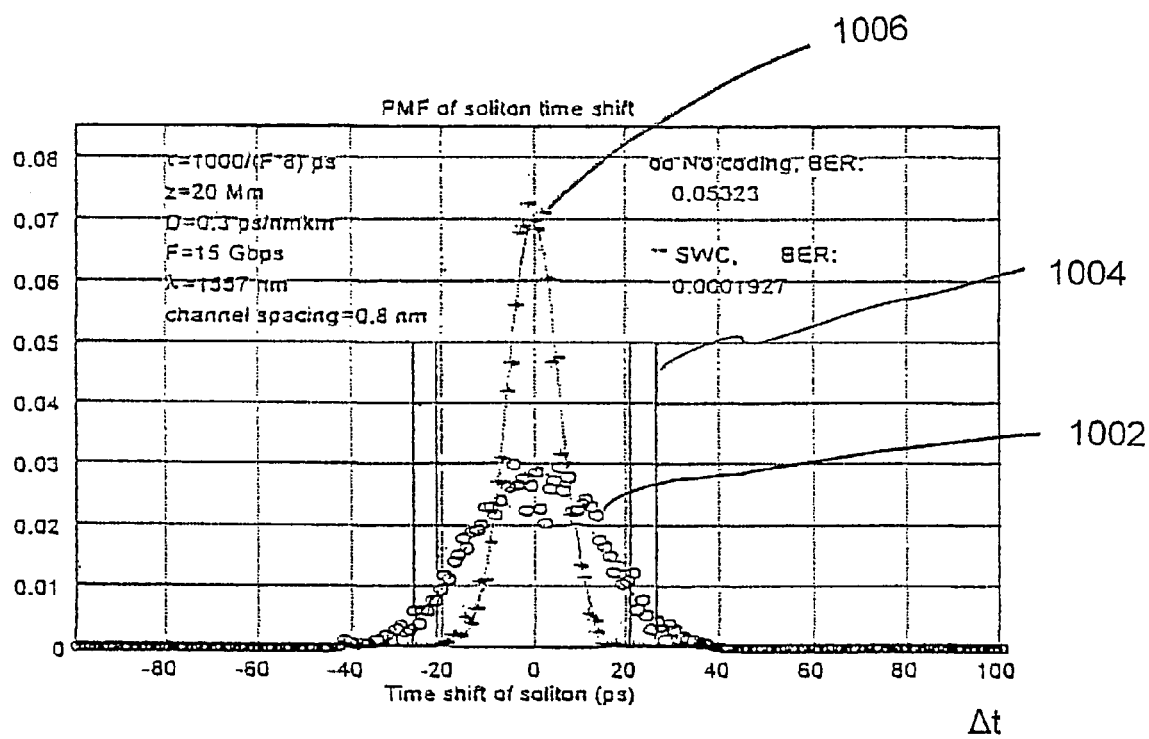
FIG. 10 is a graphical plot of reduction in collision induced timing jitter by a SWC block code.

With reference to FIG. 10, comparative graphical plots of results of timing jitter reduction are shown for a simplified SSC model having 4-channels in a system with a 20 Megameter fiber with a soliton acceptance window of 0.8T (i.e., solitons are accepted as being present in time slot T if the soliton is found in the acceptance window having a width 0.8T. In FIG. 10 the horizontal axis represents the magnitude of a soliton time shift in pico-seconds and the vertical axis represents the probability of the corresponding soliton time shift.

Plot 1002 represents a probability distribution of a soliton time shift for a binary data stream without coding. Plot 1004 represents a probability distribution of a soliton time shift for a binary data stream with Reed-Solomon (RS) coding; and plot 1006 represents a probability distribution of a soliton time shift for binary data stream with concatenated Sliding Window Criterion/Reed Solomon (SWC/RS) coding of the present invention. As can be seen in FIG. 10, plot 1006 is narrower than plot 1002 indicating that the variance component of the SWC/RS coding of the present invention is smaller than the variance component of an un-coded input signal. Additionally, plot 1004 indicates that RS coding results in discrete positive and negative time shifts. The Bit Error Rates (BERs) of these data streams are also provided for different transmission rates and channel spacing values.

Figure 11A:
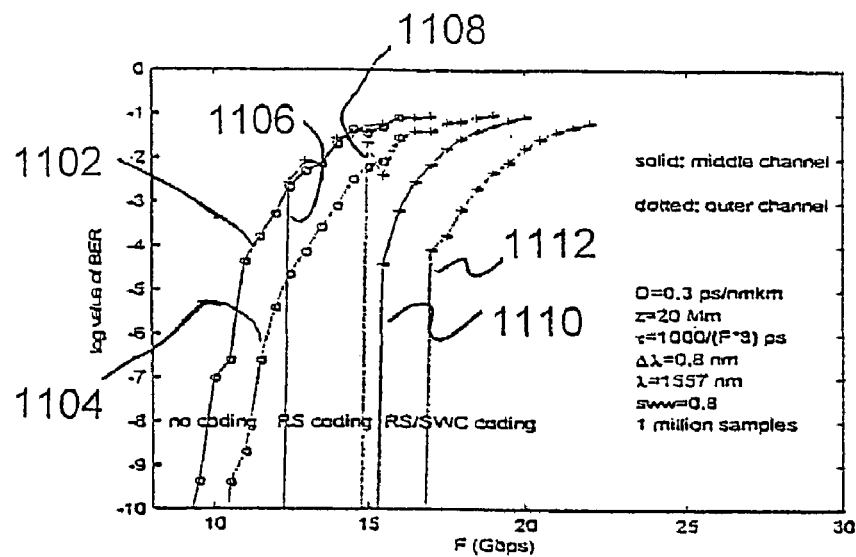
FIGS. 11a–11b are comparative graphical plots of the continuous components of the PSD for plots of each of: no coding, Reed-Solomon (RS) coding and SWC/RS coding.
Figure 11B:
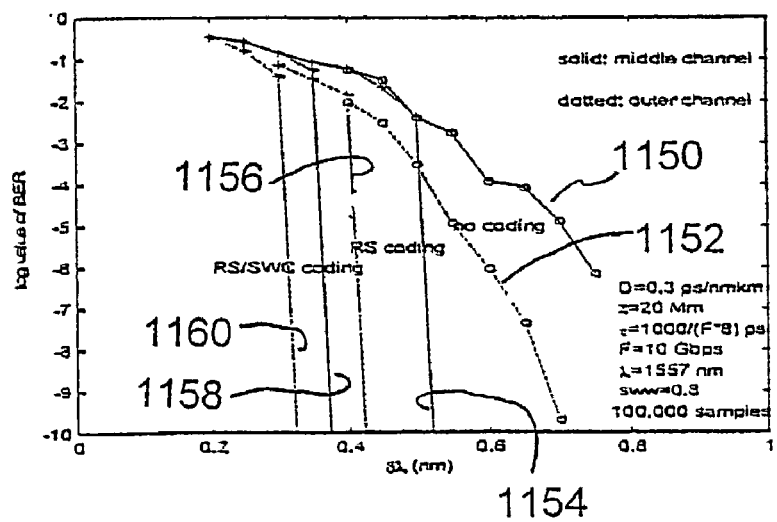

In FIGS. 11a and 11b comparative graphs of the BERs are similarly provided for binary data streams in each of two channels having no coding, RS coding, and SWC/RS coding. FIG. 11a plots the log of the BER along the vertical axis as a function of frequency along the horizontal axis. FIG. 11b plots the log of BER along the vertical axis for a constant frequency as a function of $\delta\lambda$ along the horizontal axis.

In FIG. 11a, plots 1102 and 1104 represent binary data streams with no coding in a middle and outer channel, respectively. Plots 1106 and 1108 represent binary data streams with RS coding in a middle and outer channel, respectively; and plots 1110 and 1112 represent binary data stream with SWC/RS coding in a middle and outer channel, respectively. Similarly, in FIG. 11b plots 1150 and 1152 represent binary data streams with no coding in a middle and outer channel, respectively. Plots 1154 and 1156 represent binary data streams with RS coding in a middle and outer channel, respectively; and plots 1158 and 1160 represent binary data stream with SWC/RS coding in a middle and outer channel, respectively.

FIGS. 10 and 11a–11b each show that the SWC based codes can effectively decrease the Soliton-Soliton-Collision (SSC) induced timing jitter in Wavelength Division Multiplexing (WDM) systems which result in obvious enhancement of the capacity in bit rate.

Simulation results are presented for some selected data patterns to demonstrate the effectiveness of the coding scheme according to the present invention.

Figure 12:
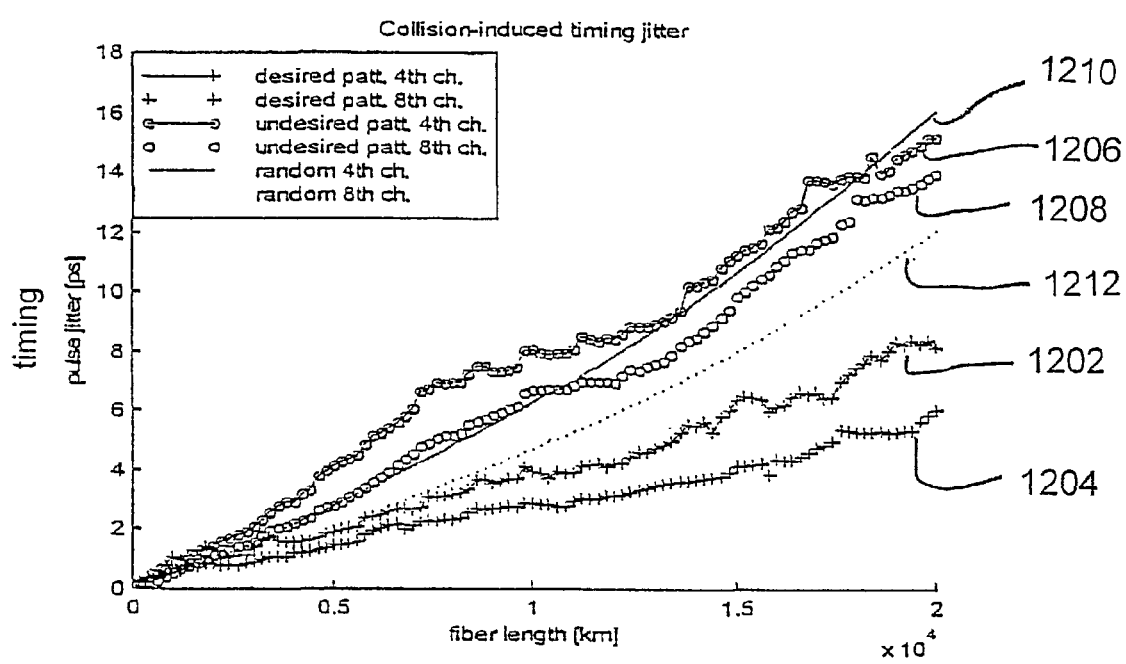
FIG. 12 are comparative exemplary plots of collision induced timing jitter of desired, undesired and random data patterns.

With reference to FIG. 12 plots of collision induced timing jitter (CITJ) as a function of transmission fiber length for "desired", "undesired", and random input data patterns are presented. The graphs of FIG. 12 are based on a system having the following parameters: 12 GHz bit rate, 100 GHz channel spacing, Gaussian pulses with $t_{FWHM}=14$ ps, and a symmetrical dispersion map with $D_1=2.34$ ps/nm-km, $D_2=-2.19$ ps/nm-km, and with each fiber segment 100 km long with lumped amplifiers placed every 50 km.

In FIG. 12 a "Desired" pattern is defined as one that better satisfies the Sliding Window Criterion (SWC) (i.e., reduces the variance in the number of collisions of the respective solitons of a pair of channels) whereas "undesired" is defined as one that does not. The CITJ curves for random input data are obtained by using a conventional approach which is shown to have good agreement with full simulation results. Plot 1202 represents pulse jitter for a "desired" pattern in a first of two measured channels. Plot 1204 represents pulse jitter for a "desired" pattern in a second of two measured channels. Similarly, plot 1206 represents pulse jitter for an "undesired" pattern in a first of two measured channels while plot 1208 represents pulse jitter for an "undesired" pattern in a second of two measured channels. Finally, plot 1210 represents pulse jitter for a random pattern in a first of two measured channels while plot 1212 represents pulse jitter for a random pattern in a second of two measured channels. Thus, a Sliding Window Criterion has been shown to be an effective and promising technique for Dispersion Managed Fiber (DMF) WDM soliton systems.

We claim:

1. Optical WDM communications apparatus which line encodes a digital data stream so as to mitigate the effects of transmission errors comprising:

an input device which provides a plurality of output words at an output thereof, each word containing an N number of bits, where N is a positive integer;

a data memory comprised of N input address lines, each address line receiving one of said N bits, a plurality of addressable memory locations, and M parallel output data lines, each memory location containing a code word having an M number of bits, where a bit is either a one or a zero, and M is a positive integer greater than N, said code words being selected so as to minimize a variance in a set of code words of the number of one's in each code word, and where the code word contained in an addressed memory location is provided at said output data lines; and an output device connected to said memory output data lines and which provides a serial output data stream comprised of the output from said data memory.

2. The Optical WDM communications apparatus as claimed in claim 1 and further comprising an optical modulator having an input connected to said output device and an output, said optical modulator producing an optical data stream in response to said serial data stream; and a fiber optic channel connected to the output of said optical modulator which receives said optical data stream and conveys said data stream therealong such that a transmission error resulting from timing jitter is minimized.

3. The Optical WDM communications apparatus as claimed in claim 1 wherein N equals 8 and M equals 10.

4. The Optical WDM communications apparatus as claimed in claim 2 and further including a further input device which provides a plurality of words at an output thereof, each word containing an M number of bits;

a further data memory comprised of M input address lines, each address line receiving one of said M bits, a plurality of addressable memory locations, and N parallel output data lines, each memory location containing a further code word having an N number of bits, where a bit is either a one or a zero, said code words being selected so as to reproduce said plurality of output words; and a further output device connected to said further memory output data lines and which provides a serial data stream comprised of the output from said further data memory.

5. The Optical WDM communications apparatus as claimed in claim 1 wherein said input device has an input that receives a stream of input data.

6. The Optical WDM communications apparatus as claimed in claim 2 and further comprising two fiber optic channels.

7. The Optical WDM communications apparatus as claimed in claim 6 wherein said communications apparatus encodes said digital data stream so as to mitigate the effects of soliton collisions, and wherein said code words are selected so as to minimize the effects of transmission errors resulting from said soliton collisions.

8. A method of optical WDM communications over a fiber optic channel which line encodes an input digital data stream so as to mitigate an effect of transmission errors, said method comprising:

providing a plurality of output words, each word containing an N number of bits, where N is a positive integer;

addressing with said output words a data memory comprised of N input address lines, a plurality of addressable memory locations, and M parallel output data lines, each memory location containing a code word having an M number of bits, where a bit is either a one or a zero, and M is a positive integer greater than N, said code words being selected so as to minimize a variance in a set of code words of the number of one's in each code word, and where the code word contained in an addressed memory location is provided at said output data lines;

providing said code words from said data memory locations that have been addressed by said output words as a serial output data stream.

9. The method of optical WDM communications as claimed in claim 8 and further comprising producing an optical data stream in response to said serial output data stream; and conveying said data stream along a fiber optic channel such that a transmission error resulting from timing jitter is minimized.

10. The method of optical WDM communications as claimed in claim 9 wherein said digital data stream is encoded communications so as to mitigate the effects of soliton collisions, and wherein said code words are selected so as to minimize the effects of transmission errors resulting from said soliton collisions.

11. A sliding window criterion method of mapping an encoding table comprising the steps of:

(A) providing an input data stream comprising a binary data bit stream;

(B) defining an index-counter i and selecting an i th sliding window having N-bits of said input data stream, where N is a positive integer, said I th sliding window starting at an i th bit and ending at an (i+(N−1) bit in said binary data bit stream;

(C) identifying a sequence of ones and zeros in said ith sliding window;

(D) assigning an M-bit code word to each said sequence of ones and zeros, where said code word has M bits and M>N, M being a positive integer, said code word being assigned so as to minimize a variance in a set of code words of a number of ones in each code word;

(E) storing said assigned M-bit code word as a data in said encoder corresponding to said one of a plurality of addresses; and (F) comparing a count of a number of unique sequences of ones and zeros with a value of $2^N$ and if less than $2^N$ unique sequences of ones and zeros have been identified, incrementing the value of the index-counter by one so that i now equals i+1, and thereby recursively defines the sliding window;

(G) and repeating steps (B) through (F).

12. The method of claim 11 wherein said sequence of ones and zeros is unique.

13. The method of claim 11 wherein said M-bit code word is unique.

14. The method of claim 11 further comprising mapping a decoding table comprising the steps of:

storing each said M-bit code word as one of a plurality of addresses in a decoder; and for each said M-bit code word, storing a one of the plurality of addresses in said encoder corresponding to said M-bit code word as a data in said decoder corresponding to said address M-bit code word.

15. A method of encoding a digital data stream to be transmitted as a sequence of pulses of light over a fiber optic transmission medium comprising the steps of:

defining a set of parametric values;
determining a fragmentation degree, FD and a logical Fragmental End value;
selecting first N-bit codes satisfying the inequality $FD_n > d_j$ wherein a logical Fragmental End value is TRUE, and defining said first N-bit codes as a $(2_j-1)$th segment of a mapping table;
comparing a count of the selected first N-bit codes with a desired count number;
defining each of said first codes in excess of said desired count number as first excess codes;
discarding the first excess codes in a last segment of the mapping table if a value of the count of the selected first codes is not less than the desired count number, thereby keeping a desired count number of codes;
selecting second N-bit codes satisfying the inequality $FD > d_j$ wherein the logical Fragmental End value is FALSE if the value of the count of the selected first codes is less than the desired count number, and defining said second N-bit codes as a $(2_j)$th segment of the mapping table;
comparing a count of the number of selected first and second codes to the value of the desired count number;
defining a number of said second codes as second excess codes if the count of the number of selected first and second codes exceeds the desired count number; and
discarding the second excess codes in the last segment of the mapping table if the number of selected first and second codes is greater than the value of the desired count number.

16. A method of encoding a digital data stream to be transmitted as a sequence of pulses of light over a fiber optic transmission medium comprising the steps of:

defining a set of parametric values;
determining a fragmentation degree and FD a logical Fragmental End value;
selecting first N-bit codes satisfying the inequality $FD_n > d_j$ wherein a logical Fragmental End value is TRUE, and defining said first N-bit codes as a $(2_j-1+2iJ)$th segment of a mapping table;
comparing a count of the selected first N-bit code words with a desired count number;
defining each of said first codes in excess of said desired count number as first excess codes;
discarding the first excess codes in a last segment of the mapping table if a value of the count of the selected first codes is not less than the desired count number, thereby keeping a desired count number of codes;
selecting second N-bit codes satisfying the inequality $FD > d_j$ wherein the logical Fragmental End value is FALSE if the value of the count of the selected first codes is less than the desired count number, and defining said second N-bit codes as a $(2_j+2iJ)$th segment of the mapping table;
comparing a count of the number of selected first and second codes to the value of the desired count number;
defining a number of said second codes as second excess codes if the count of the number of selected first and second codes exceeds the desired count number; and
discarding the second excess codes in the last segment of the mapping table if the number of selected first and second codes is greater than the value of the desired count number.

* * * * *